(12) United States Patent
Gauthier et al.

(10) Patent No.: US 8,840,710 B2
(45) Date of Patent: Sep. 23, 2014

(54) PURIFICATION SYSTEM OF FLUID CHARGED WITH PARTICLES BY FORCE OF THERMOPHORESIS

(75) Inventors: Paola Gauthier, Piedecuesta (CO); Gerard Antonini, Paris (FR); Pierre Mercier, Saint Egreve (FR); Patrice Tochon, Uriage (FR)

(73) Assignee: Commissariat a l'Energies Atomique et aux Energies Alternatives, Paris (FR)

( * ) Notice: Subject to any disclaimer, the term of this patent is extended or adjusted under 35 U.S.C. 154(b) by 445 days.

(21) Appl. No.: 13/258,000
(22) PCT Filed: Mar. 23, 2010
(86) PCT No.: PCT/EP2010/053765
§ 371 (c)(1),
(2), (4) Date: Jan. 31, 2012
(87) PCT Pub. No.: WO2010/108914
PCT Pub. Date: Sep. 30, 2010

(65) Prior Publication Data
US 2012/0111200 A1    May 10, 2012

(30) Foreign Application Priority Data
Mar. 25, 2009 (FR) ...................... 09 51908

(51) Int. Cl.
| | |
|---|---|
| *B01D 53/00* | (2006.01) |
| *F28F 1/22* | (2006.01) |
| *B01D 49/02* | (2006.01) |
| *F28F 1/18* | (2006.01) |
| *F28D 9/00* | (2006.01) |

(52) U.S. Cl.
CPC . *B01D 49/02* (2013.01); *F28F 1/22* (2013.01); *F28F 1/18* (2013.01); *F28D 9/0031* (2013.01)
USPC .............................................. 95/289; 96/221

(58) Field of Classification Search
USPC ........................ 95/288, 289; 96/221; 165/172
See application file for complete search history.

(56) References Cited

U.S. PATENT DOCUMENTS 7,934,542 B2 * 5/2011 Tsai et al. ..................... 165/157

FOREIGN PATENT DOCUMENTS

| DE | 2 044 817 | 7/1972 |
|---|---|---|
| DE | 299 25 003 | 2/2008 |
| GB | 2 319 191 | 5/1998 |
| WO | 00 23165 | 4/2000 |
| WO | 01 32294 | 5/2001 |

OTHER PUBLICATIONS

International Search Report Issued Aug. 2, 2010 in PCT/EP10/053765 filed Mar. 23, 2010.

* cited by examiner

*Primary Examiner* — Robert A Hopkins
(74) *Attorney, Agent, or Firm* — Oblon, Spivak, McClelland, Maier & Neustadt, L.L.P.

(57) ABSTRACT

A fluid treatment system by force of thermophoresis, including first and second modules between which the fluid to be treated is intended to circulate, the first module configured to be brought to a temperature greater than that of the second module so as to engender a temperature gradient causing a force of thermophoresis capable of projecting the particles to be purified in the direction of the second module. The first module includes a succession of parallel first tubes configured to be traversed by hot fluid, the second module includes a succession of parallel second tubes configured to be traversed by cold fluid, and the first tubes are arranged staggered with the second tubes.

10 Claims, 4 Drawing Sheets

PURIFICATION SYSTEM OF FLUID CHARGED WITH PARTICLES BY FORCE OF THERMOPHORESIS

The invention relates in general to the field of fluid treatment by force of thermophoresis, such treatment usually being carried out to purify unwanted particles contained in the fluid.

The invention preferably relates to treatment of gas containing solid or liquid aerosols to be eliminated, and whereof the particles have an average diameter of less than 10 µm, or even less than 1 µm.

The prior art discloses systems capable of allowing such fluid treatment by force of thermophoresis. Some of these systems are characterised by the use of a wall cold to contact by hot gas to be purified, on which the particles contained in the gas are deposited under the effect of the thermophoretic force undergone by these particles, due to the fact of the existence of a temperature gradient between the hot gas and the cold wall. In this case the deposit yield decreases continuously, due to the fact of progressive cooling of the gas to be purified, in contact with the cold wall.

Other systems comprise first and second modules located opposite one another and between which the fluid to be treated circulates. The first module is intended to be brought to a temperature greater than that of the second module so as to engender a temperature gradient causing the force of thermophoresis capable of projecting the particles to be purified, contained in the fluid to be treated, in the direction of the second module.

Yet, such systems are not entirely optimised in terms of ratio between the effective deposit surface of the particles to be purified and the overall volume of the treatment device, pressure strength, and homogeneity of the temperature within each of the two modules.

To at least partially rectify these disadvantages, the aim of the invention is a fluid treatment system by force of thermophoresis comprising a treatment device comprising first and second modules located opposite one another and between which the fluid to be treated is intended to circulate, the first module being intended to be brought to a temperature greater than that of the second module so as to engender a temperature gradient causing a force of thermophoresis capable of projecting the particles to be purified, contained in the fluid to be treated, in the direction of the second module. According to the invention, said first module comprises a succession of parallel first tubes connected together and intended to be traversed by a first heat-transfer fluid called hot fluid, said second module comprises a succession of parallel second tubes connected together and intended to be traversed by a second heat-transfer fluid called cold fluid, and the first tubes are arranged staggered with the second tubes.

Also, said system comprises means for circulating said hot fluid through the first tubes of the first module, means for circulating said cold fluid through the second tubes of the second module, and means for circulating said fluid to be treated between said first and second modules.

This arrangement first presents a very high ratio between the effective deposit surface of the particles to be purified and the overall volume of the treatment device, and this in particular due to the presence of the second tubes increasing said effective deposit surface, and also due to the staggered arrangement of the first and second tubes, offering an advantageously reduced overall bulk.

Also, the presence of the first and second tubes within the heat-transfer modules imparts satisfactory pressure strength, particularly interesting in the sense that injection of the fluid to be treated, between the two modules of the device, can be done at a very high pressure, for example several tens of bars.

Finally, the design of heat-transfer modules produces a homogeneous temperature inside each of them, the result of better purification efficacy of particles charging the fluid to be treated.

Preferably, the first module is intended to be brought to a temperature greater than that of the gas to be treated, itself greater than that of the second module so as to engender a uniform temperature gradient in the direction of the path of the fluid to be treated, causing a substantially constant force of thermophoresis. Therefore, the temperature of the gas to be treated is preferably between the temperatures of the hot heat-transfer fluid and of the cold heat-transfer fluid.

It is also preferable for the flow area arranged between the two modules to be of substantially constant thickness to favour the stability of the thermophoretic gradient.

To further improve the homogeneity of temperature within the modules of the treatment device, it is preferably ensured that each of the first and second modules is made from a first metal sheet presenting, alternatingly, first plane portions and first portions forming semi-tubes, and a second metal sheet presenting, alternatingly, second plane portions and second portions forming semi-tubes, the first and second metal sheets being plated to one another so that the first and second plane portions are supported two by two and so that the first and second portions forming semi-tubes are opposite two by two to form said tubes. Preferably, the plane portions have a width between the tubes substantially equal to the width of the semi-tubes, this width corresponding to the external diameter of these semi-tubes when the latter adopt a circular cross-section. With this configuration, it is effectively possible to produce a temperature substantially identical for the portions forming semi-tubes and the plane portions connecting them. Preferably, each of these metal sheets has a substantially constant thickness.

Of course, other manufacturing methods are feasible, such as for example ensuring that each of the first and second modules is made from plane portions and tubes arranged alternatingly, and attached to each other preferably by welding.

Preferably, the pitch (p1) between the first tubes and the pitch (p2) between the second tubes are identical, preferably equal to twice the width of the first and second tubes. Thus it is possible to bring the tubes of the first modules closer to the plane portions of the second module, and inversely, to produce minimal bulk.

Preferably, said first and second tubes each present a circular cross-section, even if other forms could be envisaged, such as a square, rectangular, or more or less flattened oval shape, without departing from the scope of the invention.

Preferably, the device comprises a number of first and second(s) modules greater than or equal to three, arranged alternatingly according to a stacking direction. This creates several flow spaces for the fluid to be treated, superposed according to the direction of stacking, within which the fluid can circulate co-current and/or counter-current, as a function of needs and restrictions encountered.

Preferably, the two modules are superposed according to a stacking direction such that the minimum distance (d), according to this direction, between each tube of a module and the opposite portion belonging to the other module, is between 2 and 10 mm, and even more preferably between 2 and 5 mm.

Preferably, the system further comprises a thermal exchanger through which, prior to their entry to said treatment device, the fluid to be treated and one of said hot and cold fluids circulate such that the latter is reheated by said fluid to be treated.

In addition, the system preferably further comprises an electric reheater for reheating at least one of said hot and cold fluids prior to its entry to said treatment device.

Finally, another aim of the invention is a fluid treatment process by force of thermophoresis carried out by means of a treatment system such as described hereinabove, the process being carried out by circulating said hot fluid through the first tubes of the first module, by circulating said cold fluid through the second tubes of the second module, and by circulating said fluid to be treated between said first and second modules.

The process is preferably carried out by applying at least one of the following parameters:
- the speed of the fluid to be treated inside the device is less than 3 m/s;
- the speed of the hot and cold fluids inside the device is between 20 and 60 m/s;
- the hot fluid has a temperature greater than or equal to 800° C.;
- the cold fluid has a temperature greater than or equal to 280° C.;
- the thermal exchange coefficient of the hot and cold fluids is between 100 and 300 W/m²/K, and preferably substantially identical for the two fluids; and
- the thermal exchange coefficient of the fluid to be treated is between 20 and 100 W/m²/K.

It is noted that numerous applications can be envisaged for the invention, such as treatment of a gaseous mixture originating from a gasifier, a combustor, an incinerator or an automobile motor, or treatment of gaseous effluent containing fine particles originating for example from the cement industry, or paints, for example metallurgic. In the case of a gasifier or a combustor, the gaseous mixture is preferably a mixture of hydrogen and carbon monoxide, also comprising impurities and solid and/or liquid aerosols which are likely to damage, or even poison equipment downstream intended to be fed by the gaseous mixture, such as compressors, turbines, or even catalysts of transformation units whereof the gaseous mixture constitutes the raw material. This is especially the case for reactors called "water-gas-shift" or even reactors called "Fischer-Tropsch". The invention advantageously permits treatment focused on eliminating solid and/or liquid aerosols contained in this type of gaseous mixture, even those whereof the constituent particles have an average diameter less than 1 μm. Such treatment is also called "dedusting".

As mentioned hereinabove, the invention applies also to treatment of exhaust gas form combustion engines, preferably for automobiles.

Other advantages and characteristics of the invention will emerge from the following detailed non-limiting description.

This description will be made with respect to the attached diagrams, in which.

Figure 2:
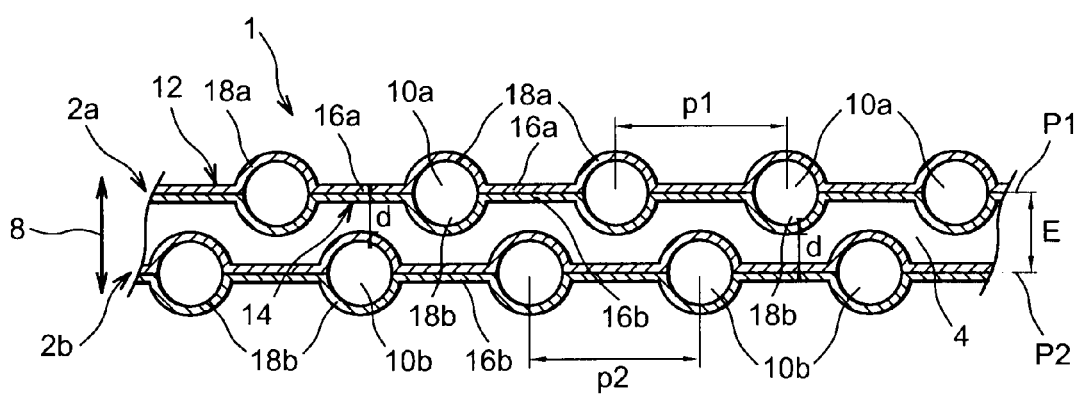
FIG. 2 illustrates a transversal sectional view taken according to the transversal plane P of FIG. 1.
Figure 2A:
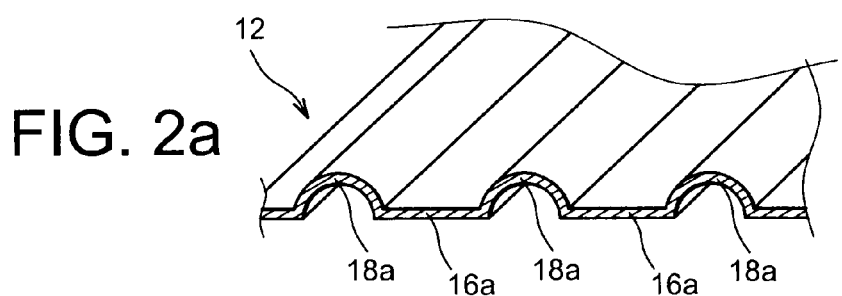
FIG. 2a illustrates a perspective view of one of the metal sheets making up the modules of the treatment device shown in the preceding figures.
Figure 2B:
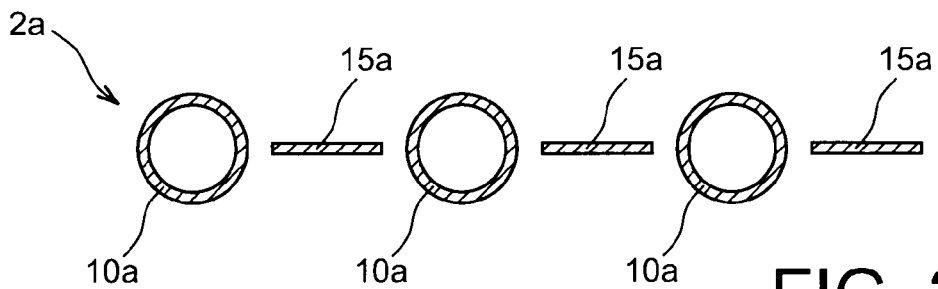
FIG. 2b illustrates an exploded view of an alternative embodiment for each of the modules of the treatment device shown in FIGS. 1 and 2.
Figure 2B:
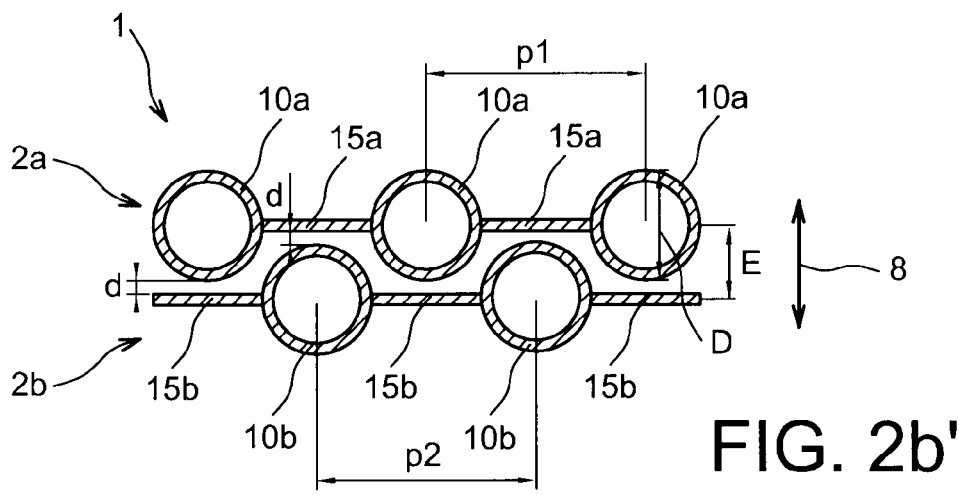
Figure 3:
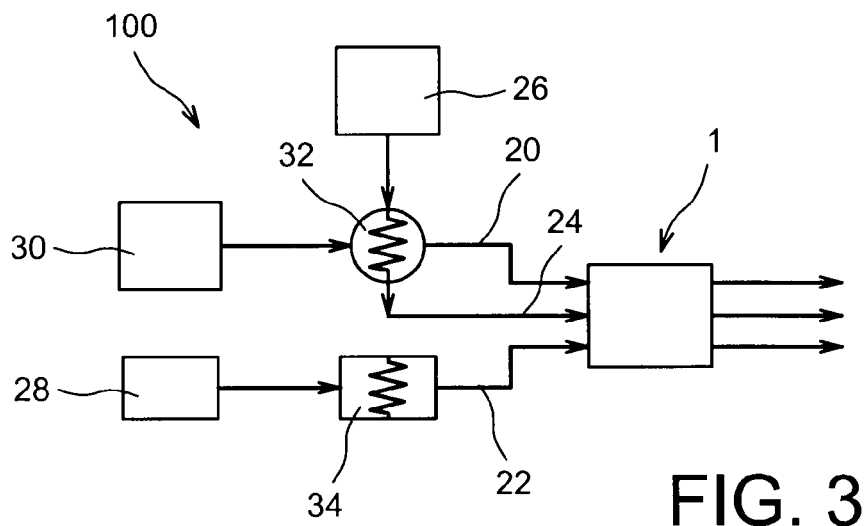
Figure 4:
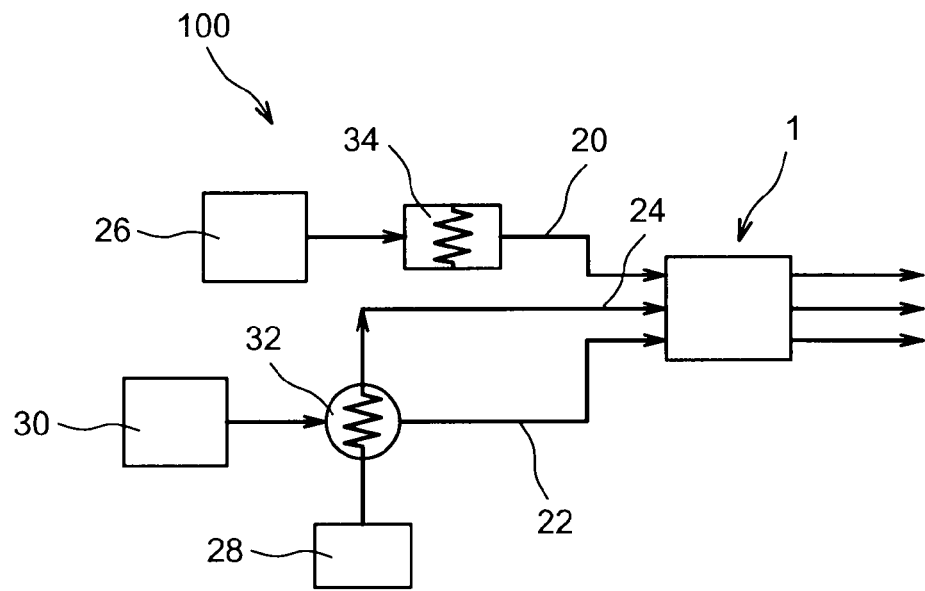
Figure 5:
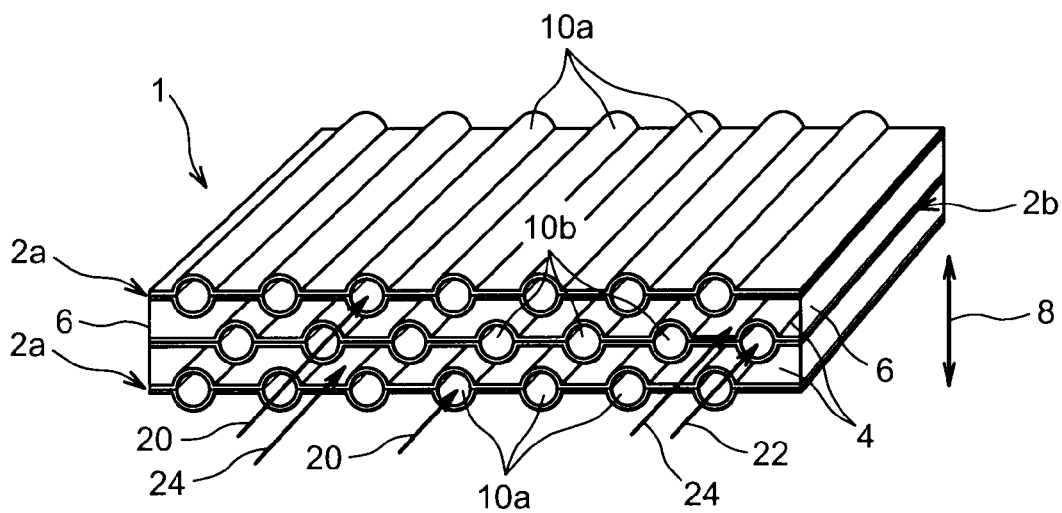
Figure 6:
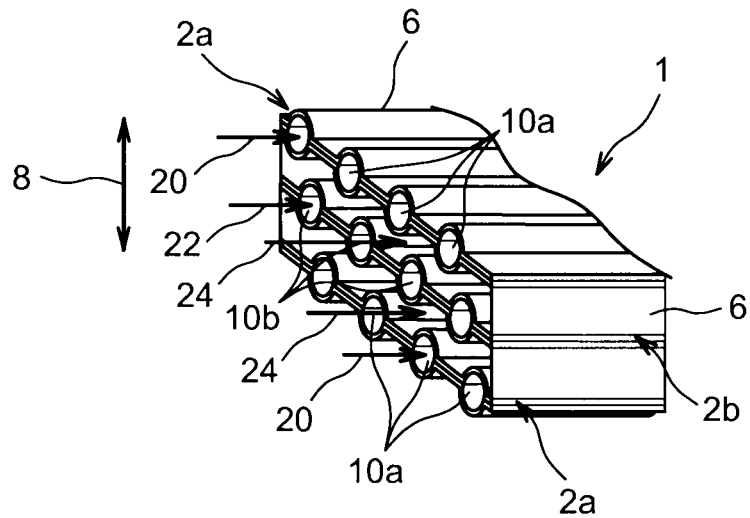
Figure 7:
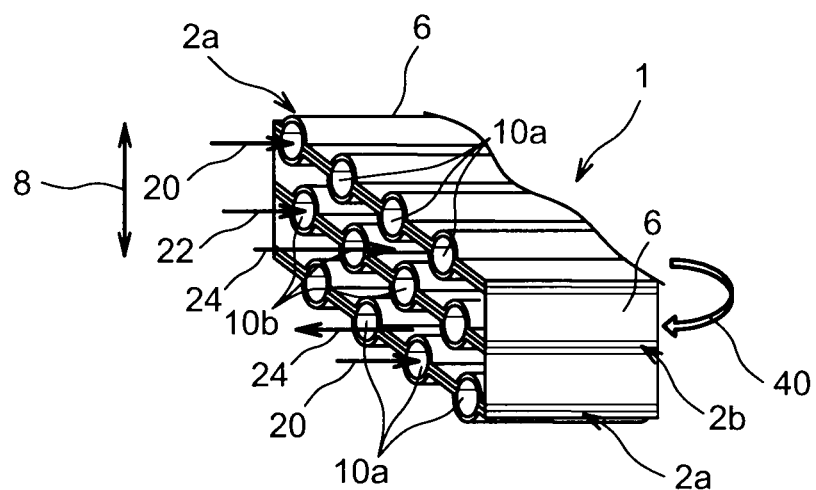

FIG. 2b' illustrates the two assembled modules, each obtained in the manner shown in the preceding figure;

FIG. 3 illustrates a schematic view of a treatment system according to a first preferred embodiment of the present invention, this system incorporating the treatment device shown in the preceding figures;

FIG. 4 illustrates a schematic view of a treatment system according to a second preferred embodiment of the present invention;

FIG. 5 illustrates a schematic view in perspective of a treatment device according to a second preferred embodiment of the present invention; and FIGS. 6 and 7 schematically illustrate two distinct ways of circulating fluid to be treated in the device shown in FIG. 5.

Figure 1:
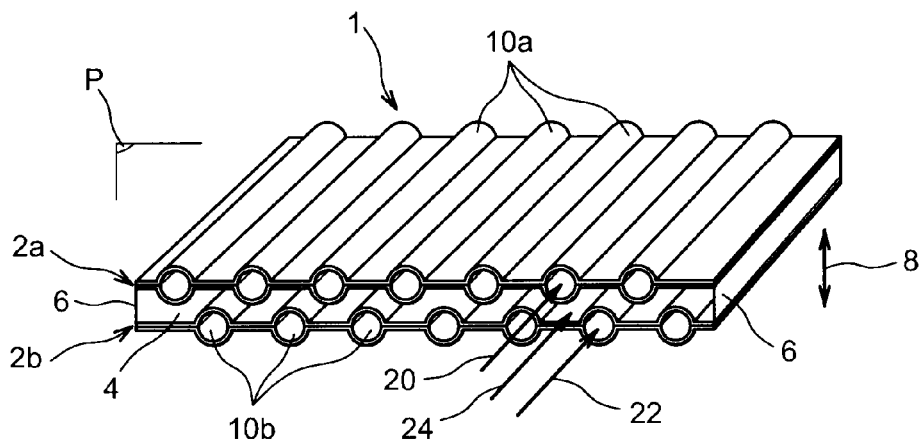
FIG. 1 illustrates a schematic view in perspective of a treatment device according to a first preferred embodiment of the present invention.

In reference first of all to FIG. 1, this shows a treatment device 1 according to a first preferred embodiment of the present invention, this device preferably serving to clean a gaseous mixture charged with solid and/or liquid aerosols, such as a gaseous mixture coming from an industrial gasifier, comprising hydrogen and carbon monoxide. This device proves particularly effective in dedusting of aerosol particles, even those reputed to be fine, specifically having an average diameter less than 1 μm.

The device 1 comprises first and second modules 2a, 2b, located substantially parallel and opposite one another, together defining a flow space 4 in which the fluid to be treated is intended to circulate. As evident in FIG. 1, lateral walls 6 are provided at the ends of the two modules 2a, 2b stacked according to the direction of stacking 8 to laterally close the flow space 4, and prevent the fluid from escaping during its treatment through the device. The first module 2a, said hot module, has a plurality of parallel first tubes 10a arranged within a row, and set apart from each other in the median plane of the module. They are connected together by substantially plane elements. In the same way, the second module 2b, said cold module, has a plurality of parallel second tubes 10b arranged within a row, and set apart from each other in the median plane of the module. They are also connected together by substantially plane elements. Of course, the arrangement presented in FIG. 1 has no limiting value as to its orientation in space, the device able to be advantageously positioned vertically, without its operation being affected.

One of the particular features of the present invention is to arrange the parallel tubes 10a, 10b staggered, the first tubes 10a located overall inserted between the second tubes 10b, and inversely. This is especially evident in FIG. 1 and FIG. 2. In the latter, a particular way of making the modules 2a, 2b is shown which will now be described. In this respect, it is noted that since the way of making the two modules 2a, 2b is identical or similar, only the description of making the first module 2a will be given here.

The hot module 2a preferably comprises two metal sheets 12, 14 which are preferably initially plane and of substantially constant thickness, then deformed mechanically by means of conventional tools. These deformations are made so that the first metal sheet 12, or upper metal sheet, alternatingly presents first plane portions 16a and first portions forming semi-tubes 18a. The first plane portions 16a are all arranged in the same plane orthogonal to the direction of stacking 8, whereas the semi-tubes 18a are oriented by being open downwards. In a similar way, the deformations of the second metal sheet 14, or lower metal sheet, are made so that the latter alternatingly presents second plane portions 16b and second portions forming semi-tubes 18b. The second plane portions 16b are all arranged in the same plane orthogonal to the direction of stacking 8, whereas the semi-tubes 18b are oriented by being open upwards.

The two resulting metal sheets 12, 14 each have the form of a puckered plate of substantially constant thickness, particularly resistant to pressure.

To produce the module 2a after each of the two metal sheets 12, 14 described hereinabove is made, the first of which 12 is shown in FIG. 2a, these two metal sheets 12, 14 are plated against each other so that the first and second plane portions 16a, 16b are supported two by two, and so that the first and second portions forming semi-tubes 18a, 18b are opposite two by two, to form the tubes 10a of the module 2a. The plane portions 16a, 16b can be assembled two by two by welding, or else by any other technique which imparts sealing to the resulting tubes.

The two modules 2a, 2b are then stacked according to the direction 8 by ensuring that the row of first tubes 10a is arranged parallel and staggered with the row of second tubes 10b.

This in particular allows the first module 2a to be brought closer to the second module 2b, since it is preferably provided that the distance E between the plane P1 integrating the axes of the first tubes 10a, and the plane P2 integrating the axes of the second tubes 10b is less than the outer diameter of the tubes 10a, 10b. In this respect, the tubes 10a, 10b effectively have a substantially circular cross-section, and all have a substantially equal diameter. Also, it is indicated that the above planes P1 and P2 correspond to the join planes between the first and second metal sheets 12, 14 making up the hot and cold modules 2a, 2b.

In addition, it is ensured that the pitch p1 between the first tubes 10a and the pitch p2 between the second tubes 10b are identical, preferably equal to twice the width of the first and second tubes 10a, 10b, this width here corresponding to the outer diameter of these first and second tubes.

Still for the purpose of limiting bulk, the first tubes 10a are centred between two second tubes 10b, and inversely, as evident in FIG. 2. Consequently, it is possible to obtain absolutely minimum distance between a tube of one of the modules and the opposite plane portion belonging to the other module, this minimal distance referenced "d" in FIG. 2 and which can in fact be between 2 and 10 mm.

In this respect, with the aim of keeping the distance "d" substantially constant all along the section in question, it can be advantageous to introduce curved portions matching, at a distance of around "d", the circular portion of the opposite tube, in place of the above plane portions.

According to an alternative embodiment shown in FIG. 2b, the module 2a is obtained from plane portions 15a and the tubes 10a arranged alternatingly, and connected to each other, preferably by welding. For the sake of clarity, FIG. 2b shows the elements 10a, 15a spaced apart from each other, but it is specified that the latter are of course intended to be in contact with each other. The module 2b is made identically.

FIG. 2b' shows the two modules 2a, 2b obtained as shown in FIG. 2a. Each of the two modules comprises for example 24 tubes 10a, 10b spaced apart from each other by the elements 15a, 15b which present a thickness of around 4 mm, as opposed to a thickness of around 3.2 mm for the tubes 10a, 10b. Each tube preferably comprises a length of around 1.3 m, and an outer diameter of the order of 60 mm. Also, as for the realisation shown in FIG. 2, the two modules 2a, 2b are superposed according to the direction of stacking 8 such that the minimum distance "d", according to this direction 8, between each tube 10a, 10b from a module and the plane portion opposite 15a, 15b belonging to the other module, is between 2 and 10 mm, and even more preferably between 2 and 5 mm.

Also, as will be explained hereinbelow, the number of stacked modules can be more than two. By way of example, it can be a device comprising about thirty of each of the first and second modules 2a, 2b arranged alternatingly.

For treatment of a gaseous mixture originating from a gasifier or a combustor, the latter can be introduced to the device at a high temperature of the order of 500 to 1000° C., at considerable pressure which can be between 5 and 40 bars. Given these severe operating conditions in terms of pressure and temperature, a nickel-based steel is preferably used for making the metal sheets 12, 14. It can be IN617 or H230. For those applications requiring less severe operating conditions, it is possible to use stainless steel 310 or even an alloy 800H, or again a nickel-based steel of type H600.

Referring back to FIG. 1, the first module 2a is intended to be brought to a temperature greater than that of the second module 2b so as to engender a temperature gradient causing a force of thermophoresis capable of projecting the particles to be purified, contained in the gaseous mixture to be treated, in the direction of the second module. To do this, a first hot heat-transfer fluid 20 is intended to be introduced to the first tubes 10a to circulate there, and a colder second heat-transfer fluid 22 is intended to be introduced to the second tubes 10b, also to circulate there. This generates a temperature gradient according to the direction of stacking 8, a gradient to which the gaseous mixture 24 introduced to the flow space 4 of the device 1 is subjected to be treated there. The temperature of the gaseous mixture to be treated is preferably between the temperatures of the hot heat-transfer fluid and the cold heat-transfer fluid. By way of indication, it is recalled that the degree of excitation of the molecules of the gaseous mixture transporting the particles to be purified depends largely on the temperature of the medium, by augmenting with the latter. So, with application of the temperature gradient obtained due to the circulation of both fluids 20, 22, the gas molecules at the hottest point impact the small-sized particles present in the gas when they pass over them, by orienting them towards the coldest point where the molecules of the mixture are less excited. Consequently, the particles to be eliminated, here the aerosols, are projected in the direction of the cold module 2b, on the upper surface of which these particles will adhere by means of other forces such as Van de Waals forces, electrostatic forces, and/or capillary forces. Alternatively, specific means for trapping particles reaching the cold module 2b can be provided, without departing from the scope of the invention.

In reference to FIG. 3, this shows a treatment system 100 according to a first preferred embodiment of the present invention, this system incorporating the treatment device 1 as well as means 26 for circulating the hot fluid 20 through the first tubes, means 28 for circulating the cold fluid 22 through the second tubes, and means 30 for circulating the gaseous mixture to be treated 24 between the first and second modules of the device.

The means 26, 28, 30 for circulating the fluids can be any type known to the specialist, without departing from the scope of the invention.

Here, the hot fluid 20 delivered via the means 26 is preferably air or water vapour at medium or high pressure, whereof the temperature is raised by its passage through a thermal exchanger 32, also traversed by the hot gaseous mixture 24. In the particular case of a gasifier or combustor, this for example lowers the temperature of the gaseous mixture 24 to around 600° C. before it enters the device 1, and brings the temperature of the hot fluid to 800° C. or more. Also, the cold fluid 22 delivered by the means 28 is preferably air or water vapour at medium or high pressure, whereof the temperature is raised by its passage through an electric reheater 34. This brings the temperature of the cold fluid to 280° C. or more for example, to avoid any problem of condensation of the tars which might be in the gas coming from a gasifier or a combustor.

To ensure efficacious and effective treatment, the thermal exchange coefficient of the hot and cold fluids is between 100 and 300 W/m$^2$/K, whereas the thermal exchange coefficient of the gaseous mixture to be treated is between 20 and 100 W/m$^2$/K, so that the latter serves only as bridge for thermal exchange. Preferably, the coefficient is substantially the same for both fluids which do not differ from each other by more than 20%.

This actually guarantees a substantially constant thermal gradient along the device 1, this criterion also being mainly obtained by using high circulation speeds of the fluids 20, 22 through their respective tubes. By way of indication, these speeds can be of the order of 20 to 60 m/s.

However, still for the purpose of efficacious treatment, the circulation speed of the gas mixture to be treated in the device 1 is preferably low, less than 3 m/s. It is really a question of keeping the gas at its best in a clearly laminar flow so that is takes only a short time to set up the thermal and hydraulic profiles and to increase the flow time inside the device. On the contrary, to prevent any unwanted deposit of particles in the exchanger 32, the gaseous mixture is set in motion within the latter at high speed, for example of the order of 20 to 60 m/s, resulting in short flow times in the exchanger, thus reducing the deposit probability. So even if particles are deposited in the exchanger, for example under the effect of the force of thermophoresis, the high speed makes it easy to again bring this deposit along with the rest of the gaseous mixture.

In the second preferred embodiment of the system 100 shown in FIG. 4, the configuration is inverted relative to the first mode, since it is the hot fluid 20 which sees its temperature raised by the electric repeater 34, and the cold fluid 22 which sees its temperature raised by its flow inside the thermal exchanger 32, also traversed by the gaseous mixture 24 to be treated.

These two solutions for making the treatment system 100 can thus be realised with the device 1 described in relation to FIGS. 1 to 2a, or even with a treatment device 1 according to a second preferred embodiment, illustrated in FIG. 5.

In this second mode, another hot module 2a is added, positioned under the cold module 2b, bringing to three the number of modules 2a, 2b stacked alternatingly according to the direction 8. This accordingly creates a second flow space 4 of the gaseous mixture to be treated, still between a hot module 2a and a cold module 2b.

The gaseous mixture 24 can be introduced co-current to the two flow spaces 4 simultaneously, as shown in FIG. 6. An alternative consists of providing that the gaseous mixture 24 is introduced only to one of the two spaces 4, then returned by means of adequate means (not shown) to then be introduced to the other flow space 4, in counter-current as shown schematically by arrow 40 of FIG. 7. The latter solution reduces the length of the treatment device, and thus proves particularly well adapted when the temperature gradient remains difficult to keep substantially constant over a long device length.

Of course, the number of heat-transfer modules 2a, 2b stacked alternatingly could be more than three, without departing from the scope of the invention.

Finally, in each of the preferred embodiments, the direction of circulation of the hot and cold fluids 20, 22 can be freely changed.

Of course, various modifications can be made by the specialist to the invention which has just been described, solely by way of non-limiting examples.

The invention claimed is:

1. A treatment system for fluid by force of thermophoresis comprising:
a treatment device including first and second modules located opposite one another and between which a fluid to be treated is circulated, the first module configured to be brought to a temperature greater than a temperature of the second module so as to engender a temperature gradient causing a force of thermophoresis capable of projecting particles to be purified, contained in the fluid to be treated, in a direction of the second module,
wherein the first module includes a succession of parallel first tubes connected together and configured to be traversed by first heat-transfer fluid as a hot fluid,
wherein the second module includes a succession of parallel second tubes connected together and configured to be traversed by a second heat-transfer fluid as a cold fluid,
wherein the first tubes are arranged staggered with the second tubes,
wherein the system further comprises:
means for circulating the hot fluid through the first tubes of the first module;
means for circulating the cold fluid through the second tubes of the second module; and
means for circulating the fluid to be treated between the first and second modules,
wherein the first and second tubes are parallel to a general direction to a flow of the fluid to be treated through the treatment system, and
wherein a stacking direction of the first and second modules is orthogonal relative to the general direction of the flow of the fluid to be treated through the treatment system.

2. The treatment system as claimed in claim 1, wherein a pitch between the first tubes and a pitch between the second tubes are identical, or are equal to twice a width of the first and second tubes.

3. The treatment system as claimed in claim 1, wherein the first and second tubes each have a circular cross-section.

4. The treatment system as claimed in claim 1, comprising a number of first and second modules greater than or equal to three, arranged alternatingly according to the stacking direction.

5. The treatment system as claimed in claim 1, wherein the first and second modules are superposed according to the stacking direction such that a minimum distance, according to the stacking direction, between each tube of a module of the first and second modules and a portion thereof opposite belonging to the other module of the first and second modules, is between 2 and 10 mm.

6. The treatment system as claimed in claim 1, further comprising a thermal exchanger through which circulate, prior to entering into the treatment device, the fluid to be treated and either of the hot and cold fluids, such that the cold fluids are reheated by the fluid to be treated.

7. The treatment system as claimed in claim 1, further comprising an electric reheater that reheats at least one of the hot and cold fluids before the at least one of the hot and cold fluids enters into the treatment device.

8. A fluid treatment process by force of thermophoresis via the treatment system as claimed in claim 1, the process comprising:

circulating the hot fluid through the first tubes of the first module;

circulating the cold fluid through the second tubes of the second module; and circulating the fluid to be treated between the first and second modules.

9. The process as claimed in claim 8, further comprising applying at least one of the following parameters:

speed of the fluid to be treated inside the device is less than 3 m/s;

speed of the hot and cold fluids inside the device is between 20 and 60 m/s;

the hot fluid has a temperature greater than or equal to 800° C.;

the cold fluid has a temperature greater than or equal to 280° C.;

the thermal exchange coefficient of the hot and cold fluids is between 100 and 300 W/m$^2$/K; and the thermal exchange coefficient of the fluid to be treated is between 20 and 100 W/m$^2$/K.

10. The treatment system as claimed in claim 1, wherein the first and second modules are superposed according to the stacking direction such that a minimum distance, according to the stacking direction, between each tube of a module of the first and second modules and a portion thereof opposite belonging to the other module of the first and second modules is between 2 and 5 mm.

* * * * *

UNITED STATES PATENT AND TRADEMARK OFFICE
CERTIFICATE OF CORRECTION

PATENT NO. : 8,840,710 B2
APPLICATION NO. : 13/258000
DATED : September 23, 2014
INVENTOR(S) : Paola Gauthier et al.

Page 1 of 1

It is certified that error appears in the above-identified patent and that said Letters Patent is hereby corrected as shown below:

On the title page, Item (73), the Assignee's name is incorrect. Item (73) should read:

-- (73) Assignee: Commissariat a l'energie Atomique et aux energies Alternative,
Paris (FR) --

Signed and Sealed this
Eighth Day of March, 2016

Michelle K. Lee
*Director of the United States Patent and Trademark Office*